United States Patent Office 3,532,524
Patented Oct. 6, 1970

3,532,524
GLAZING COMPOSITIONS AND PROCESS
Richard W. Petticrew, Perrysburg, Ohio, assignor to Owens-Illinois, Inc., a corporation of Ohio
No Drawing. Filed Oct. 6, 1966, Ser. No. 584,661
Int. Cl. C03c 5/02
U.S. Cl. 106—48      7 Claims

ABSTRACT OF THE DISCLOSURE

Decorative glazing compositions are disclosed, for low expansion vitreous bodies, having a coefficient of expansion of less than $25 \times 10^{-7}/°$ C., without peeling and with minimum crazing. The glazes have specific compositions of a number of oxides.

This invention relates to glazing compositions and to a process of production. More specifically, this invention relates to glazes for very low-expansion bodies such as glass-ceramic bodies.

GLASS CERAMIC MATERIALS

Ceramic materials from thermally crystallizable glasses have become known in the relatively recent art, and many practical uses have been found for them. Further, due to the very favorable properties of low coefficient of thermal expansion, high flexural strength, zero porosity, etc., they have many potential uses as yet untapped. These new ceramic materials can be made by in situ crystallization of a multitude of very small crystals in thermally crystallizable glasses. The glass composition is provided with a nucleating agent to initiate crystal formation. In a usual operation, an article is formed of the glass and thereafter crystallization is effected by programmed heat treatment.

One important glass series that is very well suited to the production of ceramics by the in situ crystallization process is described in copending application Ser. No. 352,958, filed Mar. 18, 1964, now patent 3,380,818 assigned to the same assignee as the present invention. These glass compositions are capable of producing crystalline ceramics having an average coefficient of lineal thermal expansion over the range from 0–300° C. of less than $25 \times 10^{-7}/°$ C.

As distinguished from many of the glasses previously proposed for ceramic formation, the reference glasses have good working properties, suitable for commercial melting and automatic machine forming operations, as well as for lamp working in the glassy state. Thus, the ease of working substantially extends the potential of glass ceramics.

The glasses of the above-identified application have liquidus temperatures below 2460° F. and contain at least the following essential components in the following weight percentage limits, based on the total composition:

TABLE I

| Oxide: | Percent by weight |
|---|---|
| $SiO_2$ | 66–73 |
| $Al_2O_3$ | 15–19 |
| $Li_2O$ | 2.5–4 |
| $MgO$ | 3–7.7 |
| $ZrO_2$ | 1–1.7 |
| $TiO_2$ | 1–less than 1.9 |

In addition, other useful and purposely added components include $SnO_2$ up to 1.7%, $P_2O_5$ up to 3% (usually 0–2), BaO up to 5%, and ZnO up to 3%, all in weight percent of the glass composition. Further, small amounts of residual arsenic and antimony oxides are often present in the compositions, since arsenic and antimony compounds are often used as fining agents. In actual practice, arsenic, expressed as $As_2O_3$, is usually present in amounts not more than 0.3 weight percent, and antimony, expressed as $Sb_2O_5$, is seldom present in amounts over 1 weight percent. Also, $Na_2O$, while not particularly desirable, is often present to a certain degree as an impurity, usually in amounts not over 1.5 weight percent. Further, when $As_2O_3$ is used as a fining agent, it is commonly added together with a little $NaNO_3$, a well-known practice. Another additive sometimes employed is F, usually in amounts not exceeding 0.4 weight percent. It is, of course, added as a salt in the usual manner, and seems to aid the crystallization process somewhat when it is employed. In summary, then, the compositions contain the following, aside from F and such fining agents as may be used:

TABLE II

| Oxide: | Percent by weight |
|---|---|
| $SiO_2$ | 66–73 |
| $Al_2O_3$ | 15–19 |
| $Li_2O$ | 2.5–4 |
| $MgO$ | 3–7.7 |
| $ZrO_2$ | 1–1.7 |
| $TiO_2$ | 1–less than 1.9 |
| $SnO_2$ | 0–1.7 |
| $P_2O_5$ | 0–3 |
| $BaO$ | 0–5 |
| $ZnO$ | 0–3 |

Accordingly, the glass and crystalline ceramic compositions of the above referenced application have the components of Table II in the amounts named as essential ingredients, and the compositions of the invention almost always, and certainly preferably, contain from 95 to 100 weight percent of such components, the other 5 to 0 percent being other compatible inorganic ingredients, usually oxides or halides. Thus, the essential properties of the thermally crystallizable glasses are usually lost with a total of over 5 percent of additives not set forth in Table II; indeed, the essential properties can be lost with the addition of 5% or less of such unnamed components, if the attempt be deliberately made. For instance, inclusion of 4 or 5 weight percent of $V_2O_5$ in glasses of Table II would produce a glass having a liquidus well above 2460° F., contrary to an essential feature of the subject glasses.

Accordingly, the invention of the above-identified application provides a substantial step forward in the art by the development of crystallizable glass compositions having good melting and forming properties as glass, and at the same time having good properties as very low expansion crystalline ceramics after heat treatment. These new compositions accomplish very difficulty achieved objectives. Thus, the glass compositions can be crystallized to ceramics having a very fine, homogeneous structure, zero porosity, low coefficients of thermal expansion, and generally high flexural strengths. All of this is accomplished by using low amounts of titania and zirconia in combination.

THE PROBLEM—Low expansion

In order to successfully market many kinds of ware made from glass ceramics, it is necessary to apply a decorative glaze. However, there are no known glazes which can be applied to very low expansion vitreous bodies such as the above disclosed glass ceramic materials. Further, the ceramics have zero porosity and there is no tooth by which an overglaze can bond to the base article.

Prior known glazing materials which have been tried for use as decorative glazes for low expansion glass ceramics have encountered the difficulty of peeling. Further, prior efforts have encountered excessive crazing problems with attempted glazing compositions for very low expansion glass ceramics.

ADVANCE PROVIDED BY THE PRESENT INVENTION

The present invention provides a further advance to the art in the form of glazing compositions for low expansion bodies of the nature discussed above.

Accordingly, it is an important object of the present invention to provide novel glazing compositions for application to low expansion glass-ceramic bodies.

A further object is to provide a method of producing glazing compositions for application to low expansion materials such as glass-ceramic bodies.

A further object is to provide a process for glazing low expansion materials such as glass-ceramic bodies.

THE INVENTION

By the present invention novel glazes have been provided that will fuse onto low expansion glass-ceramic bodies (expansion of less than $25 \times 10^{-7}/°$ C.) without peeling and with minimum crazing. The compositions of the present invention contain at least the following essential components in the percentages indicated, based on total composition:

TABLE III

| Oxide: | Percent by weight |
|---|---|
| $SiO_2$ | 60–75 |
| $Li_2O$ | 0–18 |
| $Na_2O$ | 0–8 |
| $B_2O_3$ | 0–30 |
| $Al_2O_3$ | 0–15 |
| $MgO$ | 0–10 |
| $TiO_2$ | 0–3 |
| $Co_3O_4$ | 0–5 |
| $Fe_2O_3$ | 0–5 |
| $NiO$ | 0–3 |
| $Cr_2O$ | 0–3 |
| $MnO$ | 0–2 |
| $CuO$ | 0–2 |
| $CaO$ | 0–5 | wherein the amount of $Li_2O$, $Na_2O$ and $B_2O_3$ is at least about 12.5%.

The $Li_2O$, $Na_2O$ and $B_2O_3$ function as fluxes to make a low-melting material. Also, $Li_2O$ combines with $Al_2O_3$ and $SiO_2$ to impart low-expansion characteristics to the glaze. $MgO$ and $CaO$ help to lower the melting point; these are semi-fluxes. $TiO_2$, $Co_3O_4$, $Fe_2O_3$, $NiO$, $Cr_2O$, $MnO$ and $CuO$ are colorants.

The above represents the broad workable composition range of ingredients of the glazes of the present invention. Within the preferred range of operation, the following weight percentages of oxides, based on total composition, can be employed:

TABLE IV

| Oxide: | Percent by weight |
|---|---|
| $SiO_2$ | 70–75 |
| $Li_2O$ ($R_2O$) | 0–8 |
| $Na_2O$ ($R_2O$) | 0–8 |
| $K_2O$ ($R_2O$) | 0–8 |
| $B_2O_3$ | 20–30 |
| $Al_2O_3$ | 0–5 |
| $MgO$ | 0–5 |
| $TiO_2$ | 0–3 |
| $Co_3O_4$ | 0–5 |
| $Fe_2O_3$ | 0–5 |
| $NiO$ | 0–3 |
| $Cr_2O$ | 0–3 |
| $MnO$ | 0–2 |
| $CuO$ | 0–2 |
| $CaO$ | 0–5 | wherein the amount of $R_2O$ is at least about 2%, and preferably about 3%.

The lower amount of $Li_2O$ ($R_2O$) is preferred in order to minimize crazing. $K_2O$ is the less desirable $R_2O$ component. The $B_2O_3$ lowers the melting point and, in general, provides desired thermal expansion properties.

Table V illustrates several specific compositions made by the present invention and falling within the ranges set forth above.

TABLE V

| Oxide | Composition Number | | | | | | | | | | |
|---|---|---|---|---|---|---|---|---|---|---|---|
| | 1 | 2 | 3 | 4 | 5 | 6 | 7 | 8 | 9 | 10 | 11 |
| $SiO_2$ | 73.97 | 64.5 | 64.5 | 61.5 | 61.5 | 70.0 | 70.0 | 70.0 | 70.0 | 72.0 | 70.0 |
| $Al_2O_3$ | 9.59 | 11.5 | 11.5 | 11.5 | 11.5 | | | | 2.0 | | |
| $Li_2O$ | 14.41 | 16.5 | 16.5 | 16.5 | 16.5 | | 5.0 | | 3.0 | 3.0 | |
| $Co_3O_4$ | 2.0 | 2.0 | 2.0 | 2.0 | 2.0 | 0.5 | 0.5 | 0.5 | 1.0 | 1.0 | 1. |
| $MgO$ | | 5.5 | 3.0 | 5.5 | 3.0 | 5.0 | | | | | |
| $CaO$ | | | 2.5 | | | | | | | | |
| $TiO_2$ | | | | 3.0 | 3.0 | | | | | | |
| $B_2O_3$ | | | | | 2.5 | 24.5 | 24.5 | 24.5 | 24.0 | 24.0 | 24.0 |
| $Na_2O$ | | | | | | | | 5.0 | | | 5.0 |

PRACTICE OF THE INVENTION

The specific glazes are formed into finely divided or powdered frit glasses in accordance with the following procedure. The ingredients were admixed and fired under oxidizing conditions in a furnace at a melting temperature in a range of about 2,000 to about 2,900° F. By so operating, homogeneous, vitreous compositions were produced. These were formed into a frit in a suitable manner as by running as a stream or layer over water-cooled metering rolls, and then into a water quench so that the thermal shock caused the glass to break up into granular frit form. Thereafter, for the practice of the invention, the granules were ground to a particle size as desired, usually in the range from about 250 to 400 mesh.

The powdered frit was then admixed with a commercial silk-screening vehicle such as wax and thermoplastic resin for application to the article to be decorated. The vehicle burns away during firing as is known in the art. Reference is made to U.S. Pat. 3,089,782 for a disclosure of silk-screening vehicles.

EXAMPLE I

In one example of practicing the invention, a thermally crystallizable glass was made from the following batch materials:

| Ingredient: | Parts by weight |
| --- | --- |
| Petalite [1] | 374 |
| Flint [2] | 63.7 |
| Alcoa A-10 Alumina [3] | 20.3 |
| Periclase [4] | 22.8 |
| Florida zircon [5] | 10.6 |
| Titanox [6] | 9.0 |
| Aluminum metaphosphate [7] | 3.8 |
| Lithium fluoride [8] | 1.37 |
| Arsenic trioxide | 1.25 |
| Niter | 1.25 |
| Water | 25.0 |

[1] 4.2% $Li_2O$, 16.2% $Al_2O_3$, 77.7% $SiO_2$, 0.4% $Na_2O$, 0.2% $K_2O$ and 0.027% $Fe_2O_3$, and other minor impurities, including 1% ignition loss.
[2] 99.9+% $SiO_2$.
[3] 99.5% $Al_2O_3$, 0.03% $Fe_2O_3$, 0.1% $Na_2O$, 0.08% $SiO_2$, 0.2+% ignition loss.
[4] 95.3% $MgO$, 0.5% $Fe_2O_3$, 2.8% $SiO_2$, 0.3% $Al_2O_3$, and 1.1% $CaO$.
[5] 66% $ZrO_2$, 33.35% $SiO_2$, 0.25% $TiO_2$, 0.1% $Fe_2O_3$.
[6] Substantially pure $TiO_2$.
[7] Substantially pure, except about 1% ignition loss.
[8] Essentially pure, LiF.

The above ingredients produced a theoretical composition as follows:

| Oxide: | Parts by weight |
| --- | --- |
| $SiO_2$ | 71.63 |
| $Al_2O_3$ | 16.5 |
| $MgO$ | 4.4 |
| $Li_2O$ | 3.3 |
| $ZrO_2$ | 1.4 |
| $TiO_2$ | 1.8 |
| $Na_2O$ | 0.2 |
| $P_2O_5$ | 0.6 |
| F | 0.2 |
| $As_2O_3$ | 0.25 |

The batch materials were melted at about 2900° F. for about 43 hours in a high-alumina refractory tank furnace, using a slight excess of air in the fuel gas mixture, to provide an oxidizing atmosphere.

During the melting of the glass a good percentage of the $As_2O_3$ and F were removed by volatilization. The analyzed composition of the glass was as follows:

| Oxide: | Percent by weight |
| --- | --- |
| $SiO_2$ | 71.2 |
| $Al_2O_3$ | 17 |
| $MgO$ | 4.3 |
| $Li_2O$ | 3.2 |
| $ZrO_2$ | 1.3 |
| $TiO_2$ | 1.8 |
| F | 0.14 |
| $P_2O_5$ | 0.6 |
| $Na_2O$ | 0.5 |

The glass had an annealing point of approximately 1210° F.; a log 4 viscosity temperature of about 2390° F.; and, a liquidus temperature of about 2555° F. A number of glass rods (canes) were pulled from the tank during the time that the glass was at a temperature in the range from about 2425° F. down to 2275° F. The canes were about 3/16" in diameter. Also, a number of 5 ounce tumblers were made from the glass in a paste mold, and several 5" diameter bowls were pressed from the glass in a press mold.

The canes and formed articles were subsequently heat treated as follows:

All articles were rather rapidly heated to 1100° F.; thereafter, the heating schedule was as follows:

1100–1200° F. at a rate of 145°/hr.;
1200–1300° F. at a rate of 25°/hr.;
1300–1600° F. at a rate of 50°/hr.;
1600–1950° F. at a rate of 145°/hr.;

Held at 1950° F. one hour; and,

Cooled at a rate of about 400° F./hr. to ambient temperature.

The heat treated articles were white, very fine grained, glossy and strong. Specifically, the modulus of rupture of the abraded rods tested was 19,000 p.s.i., and they withstood thermal shock when plunged into water at about 1300° F. temperature differential. Thus, the rods were at about 1380° F., while the water was at about 80° F. or less. The measured average coefficient of lineal thermal expansion of the rods was $18.7 \times 10^{-7}$ between 26° C. and 694° C.

Formed articles of the above glass-ceramic were glazed with a composition No. 9 of the present invention. The procedure was as follows:

A dip coating was made by admixing a powdered frit glass No. 9 with a silk-screening vehicle. This dip coating was applied to 5" diameter green, uncrystallized, glass bowls. Then, the bowls were heat treated according to the schedule shown above, which was effective to simultaneously fire the glaze.

EXTENDED SCOPE OF INVENTION

The glass-ceramic compositions discussed above, with reference to copending application Ser. No. 352,958, filed Mar. 18, 1964, are exemplary of the use of the present invention. Additionally, the glazes of the present invention are applicable to use with other low expansion glass-ceramics known in the art. These are typified by U.S. Pat. 3,117,881 to Henry et al.; German Pat. 1,099,135; Belgian Pat. 609,529 to Fuji Photo Film Company, Ltd.; Japanese Patent Publication 3912/63 (Apr. 20, 1963); and, French Pat. 1,337,180, dated July 29, 1963, to Fuji Photo Film Company.

The glazes of the present invention are fusible at temperatures that are not harmful to the glass-ceramic ware. The upper level is, therefore, determined by the vitrification of the glass-ceramic ware. An exemplary glass ceramic provides a fusing limit of about 1900° F.

Further, the glazes of this invention adhere well to the glass-ceramic ware with a minimum of crazing.

Generally, thin coatings are preferred for optimum results.

What is claimed is:

1. A glazing composition for glass-ceramic materials having a coefficient of thermal expansion over the range 0–300° C. of less than $25 \times 10^{-7}$/° C., the glazing composition consisting essentially of the following components:

| Oxide: | Percent by weight |
| --- | --- |
| $SiO_2$ | 73.97 |
| $Al_2O_3$ | 9.59 |
| $Li_2O$ | 14.41 |
| $Co_3O_4$ | 2.0 |

2. A glazing composition for glass-ceramic materials having a coefficient of thermal expansion over the range 0–300° C. of less than $25 \times 10^{-7}$/° C., the glazing composition consisting essentially of the following components:

| Oxide: | Percent by weight |
| --- | --- |
| $SiO_2$ | 70.0 |
| $Co_3O_4$ | 0.5 |
| $MgO$ | 5.0 |
| $B_2O_3$ | 24.5 |

3. A glazing composition for glass-ceramic materials having a coefficient of thermal expansion over the range 0–300° C. of less than $25 \times 10^{-7}$/° C., the glazing composition consisting essentially of the following components:

| Oxide: | Percent by weight |
|---|---|
| $SiO_2$ | 70.0 |
| $Li_2O$ | 5.0 |
| $Co_3O_4$ | 0.5 |
| $B_2O_3$ | 24.5 |

4. A glazing composition for glass-ceramic materials having a coefficient of thermal expansion over the range 0–300° C. of less than $25 \times 10^{-7}/°$ C., the glazing composition consisting essentially of the following components:

| Oxide: | Percent by weight |
|---|---|
| $SiO_2$ | 70.0 |
| $Co_3O_4$ | 0.5 |
| $B_2O_3$ | 24.5 |
| $Na_2O$ | 5.0 |

5. A glazing composition for glass-ceramic materials having a coefficient of thermal expansion over the range 0–300° C. of less than $25 \times 10^{-7}/°$ C., the glazing composition consisting essentially of the following components:

| Oxide: | Percent by weight |
|---|---|
| $SiO_2$ | 70.0 |
| $Al_2O_3$ | 2.0 |
| $Li_2O$ | 3.0 |
| $Co_3O_4$ | 1.0 |
| $B_2O_3$ | 24.0 |

6. A glazing composition for glass-ceramic materials having a coefficient of thermal expansion over the range 0–300° C. of less than $25 \times 10^{-7}/°$ C., the glazing composition consisting essentially of the following components:

| Oxide: | Percent by weight |
|---|---|
| $SiO_2$ | 72.0 |
| $Li_2O$ | 3.0 |
| $Co_3O_4$ | 1.0 |
| $B_2O_3$ | 24.0 |

7. A glazing composition for glass-ceramic materials having a coefficient of thermal expansion over the range 0–300° C. of less than $25 \times 10^{-7}/°$ C., the glazing composition consisting essentially of the following components:

| Oxide: | Percent by weight |
|---|---|
| $SiO_2$ | 70.0 |
| $Co_3O_4$ | 1.0 |
| $B_2O_3$ | 24.0 |
| $Na_2O$ | 5.0 |

References Cited

UNITED STATES PATENTS

| | | | |
|---|---|---|---|
| 2,239,551 | 4/1941 | Dalton et al. | 106—54 XR |
| 2,741,008 | 4/1956 | Snoddy | 117—125 XR |
| 2,971,853 | 2/1961 | Stookey | 106—54 XR |
| 3,019,116 | 1/1962 | Goucette | 106—48 XR |
| 3,051,592 | 8/1962 | Woerner | 106—54 XR |
| 3,200,310 | 8/1965 | Carman | 106—54 XR |
| 3,226,342 | 12/1965 | Kesten | 106—54 XR |
| 3,349,275 | 10/1967 | Blum et al. | 106—54 XR |
| 3,368,712 | 2/1968 | Sanford et al. | 106—48 XR |
| 3,384,508 | 5/1968 | Bopp et al. | 106—39 |

FOREIGN PATENTS 1,287,584   6/1963   France.
(2nd addition to No. 80,991)

HELEN M. McCARTHY, Primary Examiner

U.S. Cl. X.R.

106—39, 52, 54; 117—125